July 26, 1949.       R. MANSFIELD       2,477,520
SPARK GAP UNIT
Filed Oct. 26, 1946
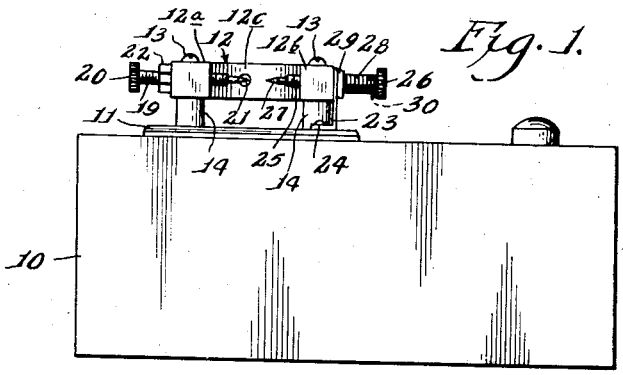
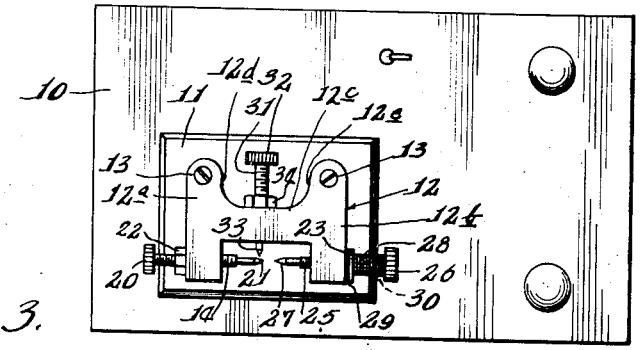
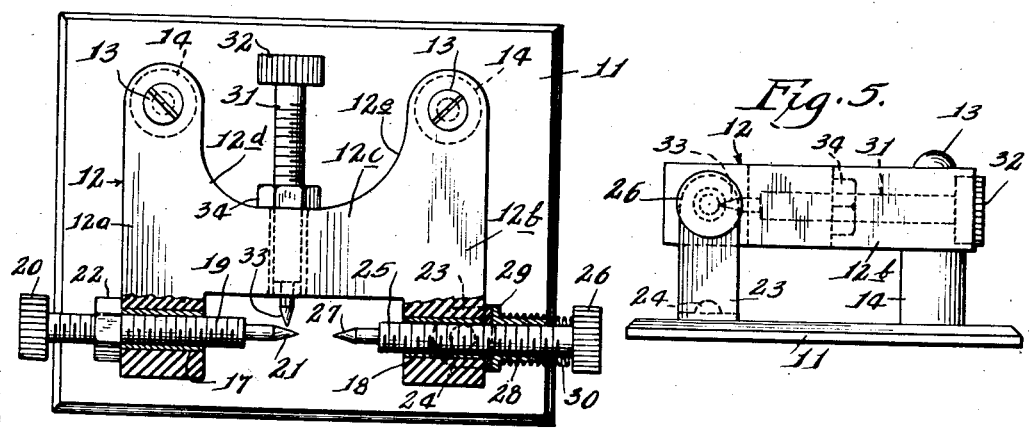
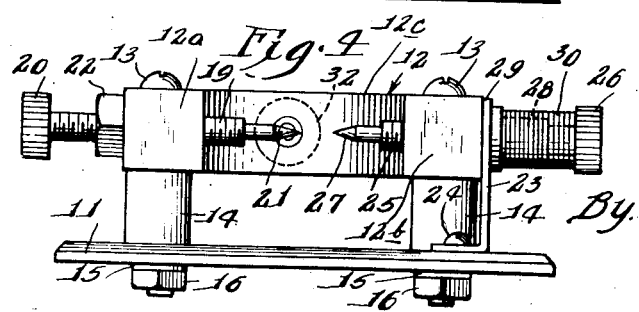
Inventor:-
Ralph Mansfield
Chritton, Schroeder,
By Merriam & Hofgren
Attorneys Patented July 26, 1949

2,477,520

UNITED STATES PATENT OFFICE 2,477,520

SPARK GAP UNIT

Ralph Mansfield, Chicago, Ill., assignor to Joseph Weidenhoff, Inc., a corporation of Illinois Application October 26, 1946, Serial No. 705,929

6 Claims. (Cl. 250—38)

This invention relates to a spark gap unit, and more particularly to a spark gap unit adapted to be used for testing purposes.

In testing certain types of coils and other apparatus, as for example automobile spark coils, it is desirable to provide a spark gap across which the potential generated by the apparatus under test may be applied in order to cause a spark to jump across said spark gap. Usually it is preferable that such gap be adjustable, and it is always desirable that the testing apparatus employed be free from insulation leaks and from the possibility of having a spark jump to parts of the apparatus other than the spark gap provided for this purpose.

Since the voltages employed in this type of work are very high and may be on the order of twelve or fifteen kilovolts, it has been found difficult to design a spark gap unit having desirable testing features and necessary safety features, while at the same time being small, compact, sturdy and simple to operate.

I have devised and am here disclosing and claiming an improved spark gap unit which overcomes all these disadvantages of prior art devices. My new spark gap unit is sturdy, compact, and simple to operate. At the same time it provides an adjustable spark gap suitable for testing coils developing a potential up to fifteen kilovolts or more, my apparatus being particularly designed to prevent insulation leaks and to forestall the possibility that a spark will jump to parts of the apparatus other than the spark gap.

In my spark gap unit a pair of spaced electrodes provide a spark gap, said electrodes being mounted upon an insulating electrode support which is adapted to be mounted upon a base plate or other holding means, mounting means being provided for this purpose. I obtain the desirable features mentioned above by providing an apparatus wherein the physical distance from either the ground electrode or the high voltage or "hot" electrode to the base plate or other holding means, and the distance from either of said electrodes to the mounting means are each greater than the maximum spark gap opening between said electrodes. In addition I provide a novel electrode support having means for mounting a static or "tickler" electrode adjacent the high voltage electrode, and while the spark gap in my new device is adjustable, stop means are provided to insure that the electrodes are not inadvertently brought too close to each other or actually shorted together.

These and other features and advantages of my invention will be apparent from the following specification and from the drawings, in which:

Figure 1 is a front elevation of my improved spark gap unit mounted on a testing box; Figure 2 is a plan view of the apparatus shown in Figure 1; Figure 3 is an enlarged plan view, partly in section, of the spark gap unit shown in Figures 1 and 2; Figure 4 is a front elevation of the spark gap unit shown in Figure 3; and Figure 5 is a side view of the apparatus shown in Figures 3 and 4, looking from the right of Figure 3, with the static electrode shown in dotted lines.

In Figures 1 and 2 the spark gap unit is shown mounted on a testing box 10, said testing box being adapted to contain apparatus such as an oscillator with its power supply, in order to provide a continuously oscillating voltage across the electrodes of the spark gap unit. In Figures 3, 4 and 5 the spark gap unit is shown alone and comprising the holding means 11 shown as a base plate, said plate being made of "Bakelite" in one embodiment of my invention which I have constructed. Holes are provided in said base plate in order that the electrode support generally indicated at 12 may be mounted thereon.

This electrode support is made of "Bakelite" or other suitable insulating material, and is formed in the general shape of an H, having a pair of spaced arms 12a and 12b, said arms being substantially parallel to each other in the particular embodiment of my invention shown, and being joined together intermediate their ends by means of the connecting portion 12c. This connecting portion itself is of a novel configuration, having a concave asymmetrically curved surface adjacent each of said arms, said curved surface being the upper surface of the connecting portion as shown in Figures 2 and 3. The curve of this surface is steeper adjacent one arm as shown at 12d and is shallower adjacent the other arm as shown at 12e, such configuration being for a purpose to be hereafter described.

The electrode support is mounted on the holding means or base plate by means of the screws or bolts 13 which are journaled through holes in one end of each of the arms 12a and 12b, and the electrode support is spaced above the base plate by means of the spacers 14 which may be of insulating material. Lock washers 15 and nuts 16 hold the respective bolts 13 in place so that the electrode support is firmly mounted on the base plate by means of this mounting means at one end of each of the arms 12a and 12b.

In constructing my spark gap unit the electrode support may be molded with brass inserts 17 and 18 molded in the other ends of the respective arms 12a and 12b. These brass inserts are then drilled and tapped to receive complementary screw threaded electrode members. Thus the brass insert 17 receives and supports a high voltage electrode member comprising a threaded body 19, a gripping means which is shown as the knurled head 20, and an electrode point 21. The body member is of conducting material and acts as a support for the electrode point 21 which may be made of Monel metal or other suitable conducting material. This electrode member is of such a length that it will extend to approximately the center between the spaced pair of arms 12a and 12b, and a lock nut 22 is provided on the body portion to hold said member in the desired position.

Similarly the brass insert 18 receives the threaded body portion 25 of another electrode member, said electrode member having a knurled head 26 and an electrode point 27 of Monel metal or other suitable conducting material. This electrode member is of substantially the same length as the first described electrode member and is adjustable, but is prevented from being inserted far enough into the arm 12b to too closely approach or actually contact the other electrode member by the stop means which comprises the shank 28 terminating in the flange 29, and the coil spring 30. As may be seen in Figures 2 and 3 this shank surrounds the body member 25, while the flange is urged toward the arm 12b. The coil spring 30 holds the stop means in against the arm 12b, and the shank member 28 acts as a stop against the knurled head 26 and prevents the electrode member from being inserted too far, while at the same time permitting said electrode to be adjustable.

A ground strap comprising the L-shaped bracket 23 of conducting material is secured beneath the lock nut, the other end of said bracket being fastened to the base plate by means of the bolt 24.

As will be apparent to those skilled in the art the electrode member which is mounted in the arm 12a is the high potential or "hot" electrode, while the electrode member which is mounted in the arm 12b is the ground electrode, and the space between the points 21 and 27 in said electrode members provides a spark gap, said spark gap being adjustable, but safety means being provided so that the electrode members may not be brought too closely together or even inadvertently shorted out. In one embodiment of my invention which I have constructed, I have found that with the electrodes so adjusted as to provide a minimum spark gap of 5 mm., adjustable to a maximum spark gap of 10 mm., coil testing could be performed up to the equivalent of 12 or 15 kilovolts. It will also be apparent to one skilled in the art that the movable electrode, here shown as the electrode mounted in the arm 12b, may be metric screw threaded as shown in the drawings or may be cam actuated when the device is used as one unit in a gang, as for example when testing an automobile distributor.

In many cases in this type of work it is desirable to provide a third electrode, this electrode being known as a static or "tickler" electrode and serving, it is believed, to partially ionize the air as the potential builds up to a point where a spark will jump the gap, thus serving to make the operation of the device more uniform. This tickler electrode is shown as comprising a threaded body member 31 having a knurled head 32 and an electrode point 33 of Monel metal or other suitable conducting material. The connecting portion 12c of the electrode support member is tapped to provide complimentary threads for the body member 31 and a lock nut 34 is provided so that the tickler electrode may be mounted in the desired position. It is desirable that this tickler electrode be mounted closer to the high potential electrode than to the ground electrode, and it is for this reason that the connecting portion of the electrode support is made with an asymmetrical concave surface for, as can be clearly seen in Figure 3, the tickler electrode is mounted in the bottom or well portion of this concave surface, and by this means a good gripping surface for the lock nut 34 is provided while at the same time the tickler electrode is much closer to the high potential electrode than it is to the ground electrode. In the operation of my device the high potential terminal of the oscillator or other device under test is connected to the high potential electrode which is inserted through the arm 12a, while the electrode in the arm 12b is adapted to be grounded through the ground strap 23. The high potential electrode may be then located in the desired position, the tickler located at the desired space above it, and the ground electrode is then movable so that the proper spark gap can be obtained.

It will be seen that the electrode support 12 is mainly mounted on the base plate at two points by means of the bolts 13 and spacers 14 at one end of the respective arms 12a and 12b, and that these points are remote from either of the electrodes, and that the distance between either of the electrodes and these mounting means is greater than the maximum distance between said electrodes. Furthermore it will be seen from Figure 4 that the distance between the electrodes and the holding means or base plate 11 is also greater than the maximum distance between said electrodes. In other words all metal-to-metal and metal-to-mounting plate distances are greater than the maximum spark gap opening, and consequently there is no opportunity for insulation leakage, and no chance for a spark to jump to some part of the apparatus other than the spark gap provided.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A spark gap unit of the character described adapted to be mounted on holding means and including: an insulating electrode support; means for mounting said support on said holding means; a pair of spaced electrodes mounted on said support and providing a spark gap, one of said electrodes being adapted to be connected to a source of high potential, the distance between either of said electrodes and said holding means and the distance between either of said electrodes and said mounting means being greater than the distance between said electrodes; and a third electrode mounted on said support, said third electrode being closer to said high potential electrode than to the other electrode.

2. A spark gap unit of the character described adapted to be mounted on holding means and including: an insulating electrode support comprising a pair of spaced arms and a portion connecting said arms; means for mounting said arms on said holding means, said mounting being adjacent one end of each of said arms; and a pair of spaced electrodes, one mounted on each of said arms adjacent the other end thereof and providing a spark gap, the distance between either of said electrodes and said mounting means being greater than the distance between said electrodes.

3. A spark gap unit of the character described adapted to be mounted on holding means and including: an insulating electrode support comprising a pair of spaced arms and a portion connecting said arms intermediate their ends; means for mounting said arms on said holding means, said mounting being adjacent one end of each of said arms; and a pair of spaced electrodes, one mounted on each of said arms adjacent the other end thereof and providing a spark gap, at least one of said electrodes being movable, the distance between either of said electrodes and said holding means and the distance between either of said electrodes and said mounting means being greater than the distance between said electrodes.

4. A spark gap unit of the character described adapted to be mounted on holding means and including: an insulating electrode support comprising a pair of spaced arms and a portion connecting said arms intermediate their ends, said connecting portion having a concave asymmetrically curved surface adjacent each of said arms, the curve of said surface being steeper adjacent one arm than it is adjacent the other; means for mounting said arms on said holding means, said mounting being adjacent one end of each of said arms; a pair of spaced electrodes, one mounted on each of said arms adjacent the other end thereof and providing a spark gap, the electrode which is mounted on the arm adjacent the steeper curved surface of the connecting portion being adapted to be connected to a source of high potential, the distance between either of said electrodes and said holding means and the distance between either of said electrodes and said mounting means being greater than the distance between said electrodes; and a third electrode mounted on the concave surface of said connecting portion, said third electrode being spaced from but adjacent said pair of electrodes and closer to said high potential electrode than to the other electrode.

5. A spark gap unit of the character described adapted to be mounted on holding means and including: an insulating electrode support comprising a pair of spaced arms and a portion connecting said arms intermediate their ends, said connecting portion having a concave asymmetrically curved surface adjacent each of said arms, the curve of said surface being steeper adjacent one arm than it is adjacent the other; means for mounting said arms on said holding means, said mounting being adjacent one end of each of said arms; a pair of spaced electrodes mounted on said support and providing a spark gap, at least one of said electrodes being movable toward and away from the other electrode, the distance between either of said electrodes and said holding means and the distance between either of said electrodes and said mounting means being greater than the maximum distance between said electrodes; and stop means for limiting the movement in at least one direction of at least one of said electrodes.

6. A spark gap unit of the character described adapted to be mounted on holding means and including: an insulating electrode support comprising a pair of spaced arms and a portion connecting said arms intermediate their ends, said connecting portion having a concave asymmetrically curved surface adjacent each of said arms, the curve of said surface being steeper adjacent one arm than it is adjacent the other; means for mounting said arms on said holding means, said mounting being adjacent one end of each of said arms; a pair of spaced electrodes, at least one of which is movable toward and away from the other, one mounted on each of said arms adjacent the other end thereof and providing a spark gap, the electrode which is mounted on the arm adjacent the steeper curved surface of the connecting portion being adapted to be connected to a source of high potential, the distance between either of said electrodes and said holding means and the distance between either of said electrodes and said mounting means being greater than the maximum distance between said electrodes; a third electrode mounted on the concave surface of said connecting portion, said third electrode being spaced from but adjacent said pair of electrodes and closer to said high potential electrode than to the other electrode; and stop means for limiting the movement in at least one direction of at least one of said electrodes.

RALPH MANSFIELD.

REFERENCES CITED

The following references are of record in the file of this patent:

UNITED STATES PATENTS

| Number | Name | Date |
|---|---|---|
| 657,378 | Andrews | Sept. 4, 1900 |
| 1,251,269 | Mulvany et al. | Dec. 25, 1917 |
| 1,479,692 | Bennett | Jan. 1, 1924 |
| 1,569,481 | Habann | Jan. 12, 1926 |
| 1,623,982 | Smith | Apr. 12, 1927 |
| 2,050,397 | Torok | Aug. 11, 1936 |

FOREIGN PATENTS

| Number | Country | Date |
|---|---|---|
| 26,136 | Great Britain | Dec. 11, 1902 |